July 19, 1927.
J. W. CONRAD
1,636,625
METHOD OF STARTING AND TRANSPLANTING PLANTS
Filed May 11, 1926
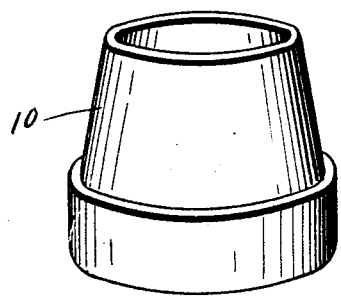
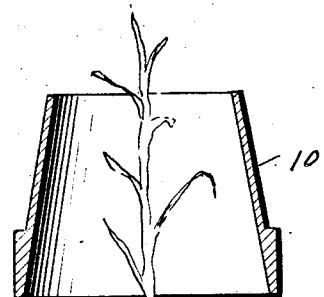
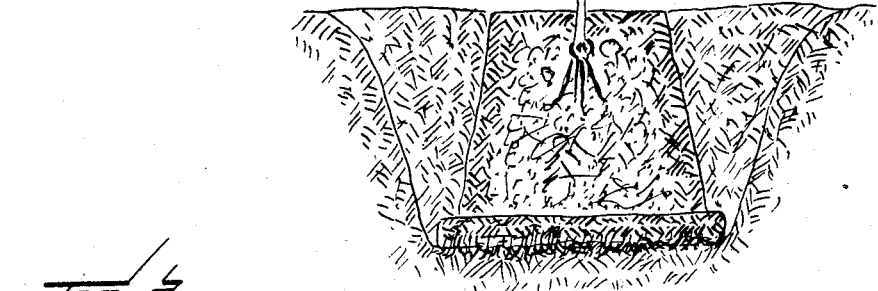
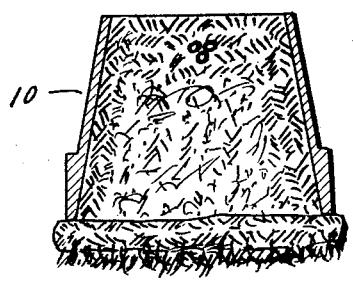
Inventor
J. W. Conrad
By Watson E. Coleman
Attorney Patented July 19, 1927.

1,636,625

UNITED STATES PATENT OFFICE.

JAMES W. CONRAD, OF ROCKBRIDGE, OHIO.

METHOD OF STARTING AND TRANSPLANTING PLANTS.

Application filed May 11, 1926. Serial No. 108,317.

This invention relates to devices in which seeds are initially planted in a hot bed or cold frame and the general object of the invention is to provide a device of this kind which will very greatly facilitate the raising of small plants from seed and which will permit the ready transfer of the small plants to the ground without the necessity of removing the rim from around the base of the plant, the device, however, being so formed as to permit the ready removal of the rim without disturbing the root system of the plant in any way.

My device is illustrated in the accompanying drawings wherein:—

Figure 1 is a perspective view of my improved growing and transplanting pot;

Fig. 2 is a sectional view through the pot, the earth therein, and the sod beneath the pot;

Fig. 3 is a sectional view showing the manner in which the pot is removed and the plant transplanted.

Referring to the drawings it will be seen that my device consists of a frustro-conical shell, preferably of earthenware or like material and designated 10, which is larger at one end than the other and is open at both ends. While the exterior of this rim may have a bead or other strengthening shoulder if desired, the interior of the rim is smooth and continuously tapering from one end to the other.

In the use of this device, a sod is cut about 2" thick and having an area as large as the large end of the shell 10. This sod is placed in a greenhouse, a hot bed, or cold frame with the grass side down, and upon this sod is placed the shell or rim 10 with its large end downward. The rim or shell is then filled with mellow soil which is firmed down and the seed is sown in the top or small end of the shell. The seed is sown two or three weeks before the weather is warm enough to permit planting out in a garden or field. About three weeks after the seed is planted, and assuming that the plants are well started and the weather is favorable, the plants are transferred to the garden or field. The plant rim or shell 10 with the plant, the earth surrounded by the rim and the sod just as they were in the greenhouse, the hot bed, or the cold frame are set permanently in furrows or hills in a field. The plant rim is then lifted up and removed entirely from the plant, leaving the cone of earth with the roots of the plant undisturbed. The soil is then thrown up around the plant. This ability to transfer or transplant the plant without any disturbance to its root system is due to the fact that the shell has the form of an upwardly tapering cone. If the shell had the form of a cylinder open at opposite ends, there would be great liability of the earth becoming broken in an endeavor to get the plug of earth out of the shell. A very slight detachment, however, of the shell from the earth permits the shell to be readily removed.

It will be seen that this device does not embody a casing for the root system which is formed with perforations as where these devices are used, the rootlets of the small plants will tend to grow out through the perforations and into the perforations of the adjacent boxes or cases and thus when one box and its plant is removed, the rootlets which extend out through the perforations in the box are liable to be broken, the earth dislodged to some extent, and the plant injured. My plant rim or shell 10 permits the roots to grow downward and straight outward in a natural way and at the same time it protects all the roots. When it has served its purpose it may be readily removed without any root disturbance whatever and then these protectors or shells may be nested one within the other for the next year so that they will take up very little room and should last a lifetime.

This device has also been found very effective in preventing slugs or cut worms from eating off the plants. This is accomplished by simply raising the rim and allowing it to rest just below the surface of the ground, encircling the plant. While preferably this rim or shell will be made of clay having the same general construction as the ordinary flower pot, the rim could be made of wood, paste board, tin or like material.

I claim:—

The method of growing and transplanting plants consisting in disposing upon a separate sod a frusto-conical shell or rim with its small end upward, filling the shell with earth and planting seeds therein, allowing the plant to grow to suitable size, then moving the rim with the sod to the permanent bed, lifting the rim to thereby dislodge its attachment to the earth and filling earth around the cone of earth left by removing the rim.

In testimony whereof I hereunto affix my signature.

JAMES W. CONRAD.